E. B. & D. F. LONG.
FARM GATE.
APPLICATION FILED APR. 12, 1918.
1,300,284.
Patented Apr. 15, 1919.
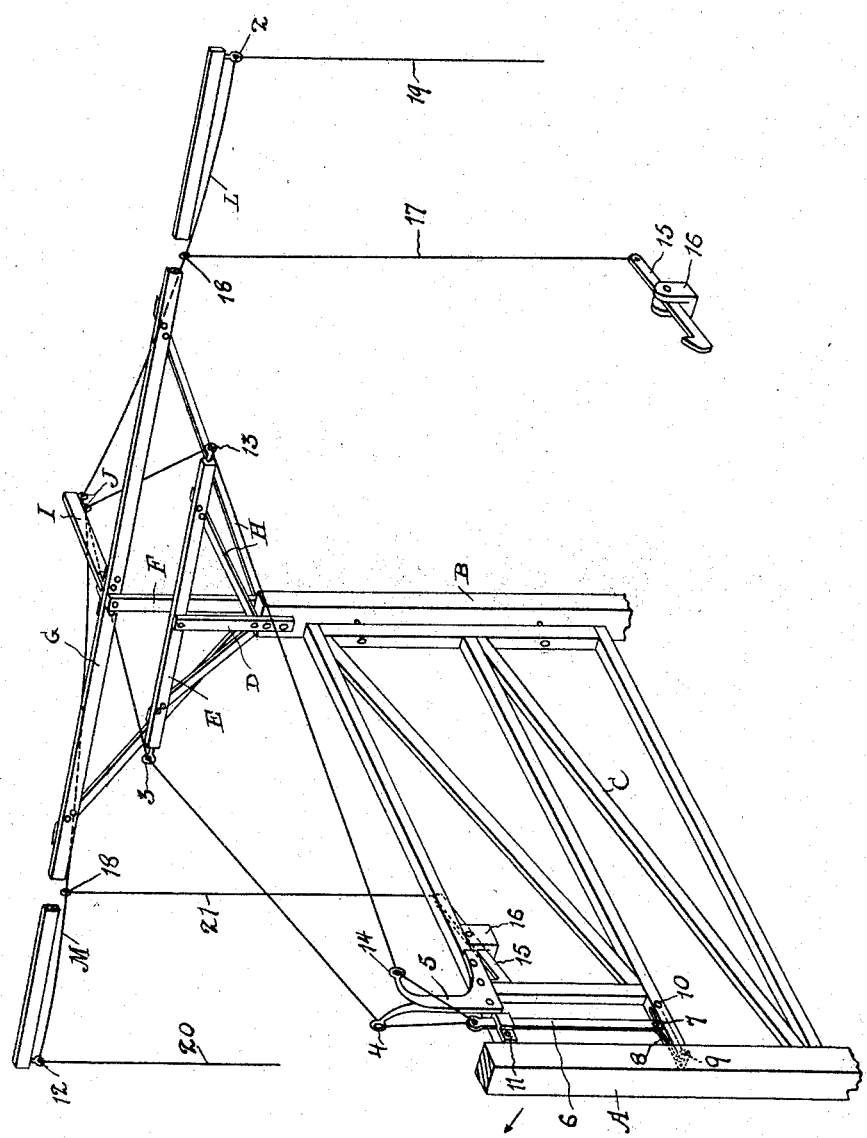
Inventors.
E. B. Long,
D. F. Long,
by Egerton R. Case
Atty.

UNITED STATES PATENT OFFICE.

EMANUEL BAKER LONG AND DEWEY FRANKLIN LONG, OF CRANE VALLEY, SASKATCHEWAN, CANADA.

FARM-GATE.

1,300,284.    Specification of Letters Patent.    Patented Apr. 15, 1919.

Application filed April 12, 1918. Serial No. 228,231.

*To all whom it may concern:*

Be it known that we, EMANUEL BAKER LONG and DEWEY FRANKLIN LONG, both subjects of the King of Great Britain, and both of the town of Crane Valley, Province of Saskatchewan, Canada, have invented certain new and useful Improvements in Farm-Gates, of which the following is a specification.

Our invention relates to improvements in farm gates, and relates more particularly to that type of gate which can be opened by a person on horseback or in a conveyance, without dismounting, and closed after passing through the gate, and the object of the invention is to improve the construction of this class of gate so that the same may be opened and closed by the expenditure of very little energy. Another object of our invention is to provide a gate of this class that can be more cheaply constructed than any now on the market.

The construction of the invention will be hereinafter particularly set forth, and what we claim as new will be pointed out in the claim forming part of this specification.

The drawing is a perspective view of our gate, showing the same closed.

A and B are the posts, and C any suitable gate, suitably hinged to the post B. D is a vertical bar suitably carried by the post B, and suitably secured to the upper end of this bar is a horizontal cross bar E. The cross bar E extends an equal distance beyond each side of the bar D. F is a vertical bar also carried by the post B and projecting thereabove. The bar F is longer than the bar D, and the same carries at its upper end a horizontal cross bar G. These horizontal bars are suitably braced as by braces H. I is a horizontal bar extending at right angles to the bar F and suitably supported thereby. The bar I is provided with a pair of eyes J. This gate is provided with two cords or ropes L and M. The first rope is threaded through the eye 2 of the bar G; one of the eyes J of the bar I; through the eve 3 of the bar E, and through the eye 4 of the plate 5, which plate is suitably carried by the gate C. One end of the cord or rope L is secured to the draw-bar 6 pivoted at its lower end at 7 to the latch 8, which co-acts with the keeper 9 carried by the post A to keep the gate closed. The said latch is pivoted at 10 to the gate. 11 is any suitable strap through which the draw-bar 6 has movement. The other draw-cord or rope M is threaded through the eye 12 of the bar G; through one of the eyes J; through the eye 13 of the bar E; through the eye 14 of the plate 5, and is secured to the draw-bar 6. The draw-cords or ropes L and M between the ends of the bar G and the bar I normally sag so that when either of these draw-cords is pulled taut, certain latches, hereinafter particularly described, will be operated to release the open gate. 15 are latches pivoted to a suitable support 16 held in the ground. 17 are cords or ropes provided at their upper ends with eyes 18 through which the draw-cords L and M are threaded. These cords or ropes 17 connect the latches 15 with the cords or ropes L and M. In order to swing the gate open in the direction indicated by arrow, the operator pulls down on the end 19 of the cord or rope L with the result that the draw-bar 6 moves the latch 8 out of engagement with the keeper 9 and permits the opening of the gate until ultimately it is held open by one of the latches 15. To close the gate, it is only necessary to pull on the end 20 of the rope or cord M. The result will be that the slack will be taken out of this rope or cord, and in doing this, the rope or cord 21 will be pulled upwardly; thus moving downward the outward end of the latch holding the gate open so that by continuing the pull on the end 20, the gate will be ultimately closed.

The horizontal bar I, positioned as described, in combination with the horizontal bar E, positioned as described, provides the necessary leverage, in combination with the eye-provided plate 5 whereby the draw-bar 6 may operate the latch 8. The said bars I and E, and plate 5 are most important for the reasons just stated.

Claim:

In combination, a pair of vertical gate posts, a gate positioned therebetween and hinged to one of the same for horizontal swinging movement, a keeper carried by one of said posts opposite the free end of said gate, a latch pivoted to said gate and coöperating with said keeper, a pair of vertical bars carried by the post to which said gate is hinged, one of said bars being longer than the other, a horizontal bar provided with eyes at the ends thereof and rigidly carried by the shorter of said vertical bars to project an equal distance beyond each side thereof, a second longer horizontal bar provided with eyes at the ends thereof and rigidly carried by the upper end of said longer vertical bar, a third relatively short horizontal bar having a pair of eyes at the free end thereof, and having its other end rigidly secured to said second horizontal bar to extend at right angles to the latter in a direction away from said gate, a plate attached to the free end of the gate provided with a pair of eyes spaced apart and positioned above the top of said gate, a vertical slidable draw-bar mounted on said gate and connected at its lower end to said latch, and a pair of cords threaded through the eyes carried by said bars and said plate and attached to said draw-bar whereby each cord may be independently pulled to operate said draw-bar and thereby release said latch from said keeper substantially as described.

EMANUEL BAKER LONG.
DEWEY FRANKLIN LONG.